United States Patent [19]

Buckholtz

[11] Patent Number: 4,935,213

[45] Date of Patent: Jun. 19, 1990

[54] ZERO DISCHARGE PROCESS FOR PREPARING POTASSIUM TRIPOLYPHOSPHATE

[75] Inventor: Harry E. Buckholtz, Lewiston, N.Y.

[73] Assignee: Occidental Chemical Corporation, Niagara Falls, N.Y.

[21] Appl. No.: 387,210

[22] Filed: Jul. 31, 1989

[51] Int. Cl.$^5$ .............................................. C01B 25/41
[52] U.S. Cl. ................................... 423/315; 210/670; 210/681; 423/181
[58] Field of Search ................ 423/181, 315; 210/670, 210/681

[56] References Cited

U.S. PATENT DOCUMENTS

| | | | |
|---|---|---|---|
| 2,230,641 | 2/1941 | Findlay | 210/681 |
| 2,373,632 | 4/1945 | Myers et al. | 210/670 |
| 2,395,825 | 3/1946 | Hesler | 210/670 |
| 2,669,713 | 2/1954 | Osmun | 210/670 |
| 3,429,657 | 2/1969 | George et al. | 210/681 |
| 4,693,828 | 9/1987 | Yoshioka et al. | 210/681 |

FOREIGN PATENT DOCUMENTS 1203581  8/1970  United Kingdom ................ 423/315

OTHER PUBLICATIONS

Kirk–Othmer, *Encyclopedia of Chemical Technology*, Third Edition, vol. 17 (1982), John Wiley & Sons, pp. 460–466.

Article by James I. Watters et al., Titled "The Acidity of Triphosphoric Acid" in J. Am. Chem. Soc. 78, 4855–4858 (1956).

Article by J. R. Van Wazer et al., Titled "Structure of Properties of the Condensed Phosphates, VII, Hydrolitic Degradation of Pyro- and Tri-Polyphosphate," J. Am. Chem. Soc. 77, 287–291 (1955).

*Primary Examiner*—Robert L. Stoll
*Assistant Examiner*—Wayne A. Langel
*Attorney, Agent, or Firm*—James F. Tao; Richard D. Fuerle

[57] ABSTRACT

Disclosed is a method of making potassium tripolyphosphate by loading an ion exchange resin with either potassium or hydrogen ions and passing an aqueous solution of sodium tripolyphosphate through the resin so that the sodium ions of the sodium tripolyphosphate are exchanged with the ions loaded onto the resin, forming either potassium tripolyphosphate or tripolyphosphoric acid, respectively. The tripolyphosphoric acid is reacted with potassium hydroxide to form potassium tripolyphosphate. When the ion exchange resin becomes exhausted it is regenerated using a potassium-containing ionic solution, forming a sodium ion containing stream. The sodium ion containing stream is reacted with a phosphoric acid to form a stream of sodium phosphates.

4 Claims, No Drawings

ZERO DISCHARGE PROCESS FOR PREPARING POTASSIUM TRIPOLYPHOSPHATE

BACKGROUND OF THE INVENTION

This invention relates to a process for preparing potassium tripolyphosphate (KTPP) from sodium tripolyphosphate (STPP) which produces no waste discharge stream. In particular, it relates to the use of an ion exchange resin loaded with potassium or hydrogen ions through which sodium tripolyphosphate is passed, followed by regeneration of the sodium tripolyphosphate from the exhausted ion exchange resin.

Potassium tripolyphosphate, $K_5P_3O_{10}$, is a low volume specialty condensed phosphate which finds utility in phosphate-built liquid detergents, in $TiO_2$ processing as a latex paint dispersant, and in some specialty food processing applications. It is believed that at the present time there is only a single United States manufacturer of potassium tripolyphosphate and that the process that manufacturer uses follows the traditional steps for polyphosphate synthesis. That is, an orthophosphate solution is formed by the reaction of aqueous phosphoric acid with the appropriate alkali metal salt until a ratio of 5 alkali metal ions to 3 orthophosphate ions is contained in the solution, followed by drying and calcination to drive off water of hydration and produce the condensed alkali tripolyphosphate. For example, an alkali metal tripolyphosphate would be prepared according to the following equation:

$$5MOH + 3H_3PO_4 \rightarrow M_5P_3O_{10} + 7H_2O$$

where M is usually Na or K.

Although the chemistry of this process is straightforward, there are several problems with the manufacture of potassium tripolyphosphate which do not occur in the manufacture of sodium tripolyphosphate. For example, during calcination the partially converted potassium phosphate species tend to lump and cake, resulting in incomplete dehydration, adherence to the calciner surfaces (which requires increased maintenance), inefficient heat utilization, an undesirable particle size distribution (which requires extensive further milling and screening), and the formation of highly insoluble potassium metaphosphates, which are very undesirable in aqueous applications requiring clear liquids. In addition, potassium tripolyphosphate cannot readily be made in sodium tripolyphosphate manufacturing equipment without incurring quality problems due to cross contamination and operability problems due to plant turndown limitations for practical operation.

SUMMARY OF THE INVENTION

I have discovered that potassium tripolyphosphate can be made by loading a cation exchange column with potassium or hydrogen ions and passing sodium tripolyphosphate through the ion exchange column. This results in the exchange of sodium ions for the potassium or hydrogen ions, forming either potassium tripolyphosphate or tripolyphosphoric acid. If tripolyphosphoric acid is formed, it is reacted with potassium hydroxide to form potassium tripolyphosphate.

Unlike the prior process which resulted in a solid product, the process of this invention produces a clear solution of potassium tripolyphosphate and therefore avoids the lumping, caking, and metaphosphate formation problems of the prior process. While the solution usually must be concentrated by evaporation of water, solutions of potassium tripolyphosphate are useable in most commercial applications and the amount of water that must be evaporated is less, resulting in a considerable energy and cost savings. In other uses for the potassium tripolyphosphate which require a dry product rather than a solution, a drum dryer or similar relatively low temperature apparatus can be utilized to produce a finely divided product without the lumping, caking, and metaphosphate by-product formation encountered with the prior process.

A most important advantage of the process of this invention, however, is that it produces no waste stream and is therefore a zero discharge process. That is, when the ion exchange resin becomes exhausted it can be regenerated, producing sodium phosphates, which can be recycled. Thus, the need to dispose of or process a waste stream is avoided.

DESCRIPTION OF THE INVENTION

The starting material for the process of this invention is an aqueous solution of sodium tripolyphosphate, $Na_5P_3O_{10}$, which has the structural formula

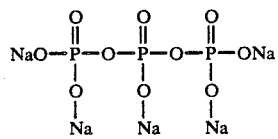

The aqueous solution can be about 2 to about 16 percent by weight sodium tripolyphosphate and is preferably about 12 to 15 percent by weight sodium tripolyphosphate.

The ion exchange column contains a cationic exchange material, which is typically an organic resin. The ion exchange column is initially loaded with potassium ions or with hydrogen ions. Preferably, the ion exchange column is loaded with potassium ions because it eliminates the need for the extra unit operation of neutralizing the tripolyphosphoric acid with KOH or $K_2CO_3$ to produce potassium tripolyphosphate. In addition, tripolyphosphoric acid is less thermally stable than potassium tripolyphosphate, requiring closer temperature control to avoid reversion of the anion to ortho or pyrophosphate. Examples of suitable loaded ion exchange materials include Dow G-23K+, Dowex 50W-X8 K+, and Dowex 50W-X8H+. When the ion exchange column is loaded with potassium ions, the temperature of the exchange column is not critical and ambient temperatures can be used, but when the ion exchange column is loaded with hydrogen ions the temperature of the solution in the ion exchange column should be less than about 25° C. because the polyphosphoric acid intermediate product that is formed is less stable at higher temperatures.

When sodium tripolyphosphate is passed through an ion exchange column that is loaded with potassium ions, the potassium tripolyphosphate product is formed immediately as the sodium ions in the sodium tripolyphosphate exchange with the potassium ions loaded onto the ion exchange column. When the ion exchange column is loaded with hydrogen ions, an intermediate product, tripolyphosphoric acid, is formed. To produce potassium tripolyphosphate from the tripolyphosphoric acid, it is simply necessary to react the tripolyphosphoric acid with a chilled solution of potassium hydroxide.

Since not all of the sodium ions may be exchanged on the ion exchange column, the resulting solution may be a mixture of polyphosphate ions, potassium ions, and sodium ions. Typically, it is a solution of about 6.0 to about 10.5% by weight polyphosphate and the proportion of potassium to sodium ions is about 25 to about 50 to one. Even though some sodium ions are present, the solution is still useful for many applications, including detergents. A higher purity product can be obtained by recycling the product solution through a second, similarly loaded ion exchange column. A more concentrated product can be obtained by the evaporation of water.

The ion exchange column can be regenerated by passing an acid solution or a potassium-containing ionic solution through it. The ion exchange column can be regenerated with potassium ions by purging or backflushing the column of the sodium tripolyphosphate solution by displacing it with air or deionized water, and subsequently exposing the ion exchange resin bed to a strong low cost potassium-containing ionic solution such as potassium hydroxide, mono-, di-, or tripotassium orthophosphate, potassium carbonate, potassium chloride or potassium sulfate. Upon bed regeneration, the effluent stream is purged with deionized water and ion exchange resins. If KOH is passed through the column a regenerate solution of NaOH is formed, and if $K_2CO_3$ is passed through the column a regenerate solution of $Na_2CO_3$ is formed. The ion exchange column can be regenerated with hydrogen ions by purging or backflushing similar to the above, followed by exposing the ion exchange resin bed with a strong mineral acid such as HCl, $H_2SO_4$, $HNO_3$, or, preferably, $H_3PO_4$.

In the preferred embodiment, the purge stream can be recycled to sodium phosphate operations, obviating the need to discharge an effluent from the commercial plant. The regenerate solution can be reacted with phosphoric acid to make sodium phosphates, thereby eliminating the need to dispose of an aqueous effluent from the process. The sodium phosphates can be used to make sodium tripolyphosphate, the starting material for the process of this invention, by returning the sodium phosphate solution to the phosphoric acid/sodium hydroxide neutralization tank to obtain the proper ratio of 5 sodium ions to 3 orthophosphate ions.

The following examples further illustrate this invention:

EXAMPLE 1

A 0.5" diameter glass column containing 426 ml of Dow G-23 K+ form ion exchange resin was used for the conversion of $Na_5P_3O_{10}$ to $K_5P_3O_{10}$. A 100 g/l $Na_5P_3O_{10}$ solution at 25° C. was charged at 3 to 4 cc per minute to the resin bed. After discarding the initial effluent, 300 cc of effluent were collected. According to analyses by x-ray and inductively coupled argon plasma spectrometry (ICAP), the phosphate composition was $K_{4.9}Na_{0.1}P_3O_{10}$, which amounts to a 98% exchange. Concentration of $K_5P_3O_{10}$ in the effluent was approximately 9.6 wt. %.

Based on nuclear magnet resonance analysis (NMR), very minor hydrolytic degradation was observed for the reaction:

| Species | Relative Mole % | |
|---|---|---|
| | Feed | Product |
| orthophosphate | 0.7 | 1.0 |
| pyrophosphate | 5.3 | 5.4 |
| tripolyphosphate | 92.7 | 92.4 |
| metaphosphate | 1.3 | 1.2 |

The column was regenerated using an 8% solution of $K_2HPO_4$.

EXAMPLE 2

A 2" diameter column containing 2.2 liters of Dowex 50W-X8 K+ form ion exchange resin was used. Sodium tripolyphosphate (100 g/l) was passed through the resin bed at approximately 18 cc/min. About 2.8 liters of product were collected, containing approximately 110 g/l of $K_5P_3O_{10}$. According to ICAP, the average exchange was 98% $K_{4.9}Na_{0.1}P_3O_{10}$. The column was regenerated using an 8% solution of $K_2HPO_4$.

EXAMPLE 3

The column was identical to the column used in Example 2. A solution containing 100 g/l $Na_5P_3O_{10}$ was passed through the resin at a flow rate of 20 cc/min. Effluent, 2.4 liters, was collected having the following composition.

Empirical Formula $K_{4.8}Na_{0.2}P_3O_{10}$
Rel. Mole % $K_5P_3O_{10}$—93.2
Rel. Mole % $K_4P_2O_7$—5.0
Rel. Mole % $K_3P_3O_9$—1.3
Rel. Mole % $K_2HPO_4$—0.5
Concentration=about 8.6 wt. % $K_5P_3O_{10}$ The column was regenerated using an 8% solution of $K_2HPO_4$.

EXAMPLE 4

A 2" diameter column containing 2.2 liters of Dow W-X8 H+ form ion exchange resin was employed for the conversion of $Na_5P_3O_{10}$ to $H_5P_3O_{10}$. A 100 g/l $Na_5P_3O_{10}$ solution at 25° C. was passed through the resin bed at a flow rate of approximately 17 cc/min. After the initial weak effluent was discarded, about 2.8 liters of approximately 65 g/l $H_5P_3O_{10}$ effluent was collected and immediately neutralized with 20% KOH.

According to ICAP, a 96% exchange rate was obtained yielding a product containing approximately 108 g/l $K_5P_3O_{10}$ and 5 g/l $Na_5P_3O_{10}$. NMR analysis showed that some hydrolytic degradation had occurred:

| Species | Relative Mole % | |
|---|---|---|
| | Feed | Product |
| orthophosphate | 1 | 4 |
| pyrophosphate | 5 | 8 |
| tripolyphosphate | 93 | 87 |
| metaphosphate | 1 | 1 |

The column was regenerated using a 6% solution of HCl.

EXAMPLE 5

An effluent containing 8.0% $K_5P_3O_{10}$ prepared by the direct ion exchange procedure was concentrated by evaporation at reduced pressure (~30 millimeters of Mercury absolute). About 2.7 liters of effluent produced 397 g of 60% $K_5P_3O_{10}$ concentrate. Average composition by ICAP was $K_{4.77}Na_{0.23}P_3O_{10}$ with minor hydrolytic degradation occurring during the concentration step operated at approximately 30° C.

|  | Relative Mole % | |
| --- | --- | --- |
| Species | Feed | Concentrate |
| orthophosphate | 0.5 | 1.8 |
| pyrophosphate | 5.0 | 5.7 |
| tripolyphosphate | 93.2 | 92.3 |
| metaphosphate | 1.3 | 0.2 |

I claim:

1. A method of making potassium tripolyphosphate from sodium tripolyphosphate with no waste stream comprising
   (1) passing a solution of said sodium tripolyphosphate through an ion exchange resin loaded with potassium ions, whereby sodium ions of said sodium tripolyphosphate are exchanged with said potassium ions;
   (2) when said resin is exhausted, regenerating said resin with a solution of potassium carbonate, potassium hydroxide, potassium chloride, potassium sulfate, or potassium orthophosphate, forming a sodium ion containing stream;
   (3) forming sodium phosphates from said sodium ion containing stream;
   (4) forming sodium tripolyphosphate from said sodium phosphates; and
   (5) recycling sodium tripolyphosphate from step (4) through said ion exchange resin in step (1).

2. A method according to claim 1 wherein the temperature of said solution is less than 25° C.

3. A method according to claim 1 wherein said solution is about 2 to about 16% by weight sodium tripolyphosphate.

4. A method according to claim 1 wherein said sodium ion containing stream is reacted with phosphoric acid to make said sodium phosphates.

* * * * *